2,979,506

PURIFICATION OF TRIETHYLENE DIAMINE

Merwin D. Oakes, Green Ridge, Pa., assignor to Houdry Process Corporation, Wilmington, Del., a corporation of Delaware No Drawing. Filed Oct. 14, 1958, Ser. No. 767,087

7 Claims. (Cl. 260—268)

The present invention relates to purification of triethylene diamine (diazabicyclo-octane 2.2.2) and is particularly concerned with the restoration of the "white" color to triethylene diamine crystals which have become yellow in storage.

Triethylene diamine, since its recent introduction on a commercial scale, is being used chiefly as catalyst in the production of polyurethane foams. This compound is prepared in desired degree of purity by the method described in copending application Serial No. 628,723, filed December 17, 1956. The method therein described involves vapor phase conversion of an aliphatic amine, preferably diethylene triamine, over solid acidic catalyst and at selected temperatures upwards of 300° C., favoring production of the desired triethylene diamine. The reaction effluent—which contains in admixture with the principal product, unreacted diethylene triamine, piperazine, pyrazine, ethylene diamine, and possibly various homologues of these—is treated by fractionation and crystallization to recover the triethylene diamine in desired state of purity. The triethylene diamine is largely concentrated in the fraction of about 150–190° C. boiling range (or more narrowly 168–175° C.) from which it is recovered, in accordance with the aforesaid application as a white crystalline solid of good purity, by cooling and separation from the mother liquor.

The obtained crystalline product of 95–98% purity has in general shown good storage stability over extended periods. Some batches of the product, however, have shown a tendency to yellow after storage varying from a month to several months. While such yellowing does not appear to interfere with the catalytic activity of the triethylene diamine, it does detract from its marketability for use in light colored foams and resins. This discoloration is believed to be due to incomplete washing of the crystals in their initial production, leaving adhering residual mother liquor which contains components which turn color as a result of oxidation or condensation.

In copending application Serial No. 734,094, an improved method for recovery of triethylene diamine from admixtures with by-products is described, wherein the mixture is distilled in the presence of xylene or of certain other water insoluble organic compounds, collecting a fraction rich in triethylene diamine of about 150° to 195° C. or narrower boiling range, from which the triethylene diamine is crystallized by cooling and washing with pentane or other saturated hydrocarbon. Here also the storage stability of the recovered triethylene diamine product will depend upon the efficiency of the washing operation.

It has now been found that the original white color of triethylene diamine which has yellowed or become otherwise discolored on standing, can be restored by treating the discolored product with liquids comprising certain organic nitrogen bases boiling in the range of about 115 to 195° C. If the product is intended to be used within several weeks after such removal of discoloring impurities, the treatment may be carried out with an alkyl or alkylol amine, among which may be mentioned ethanolamine, diethanolamine, ethylene diamine, diethylene triamine, and higher boiling liquid alkylene polyamines of the $H_2NC_2H_4(-NH-C_2H_4)_xNH_2$ type. The treating agent need not be a single pure amine but can be a mixture of amines or a solution or liquid composition rich in one or more of these amines.

While the reasons for the development of the yellow discoloration cannot be fully and reliably explained, it is believed that such off-color develops in the triethylene diamine as a result of small amounts of diethylene triamine or other alkylene polyamines or their condensation products present as impurities in the crystals due to incomplete washing of initial crystalline material, which amines take on color on standing as a result of oxidation or condensation. Supporting this posibility is the observation that crystals of triethylene diamine which have been washed more carefully and more extensively in aliphatic hydrocarbon, such as pentane, did not develop discoloration on several months' standing. In treating the discolored crystals with liquid alkyl or alkylol amines, the treated crystals should, therefore, preferably be thoroughly washed with aliphatic hydrocarbon to remove the treating agent.

If the discolored crystals, after decolorizing and purification, are expected to be stored for some time, say a month or more, before their being used, it is preferred to effect the treatment with heterocyclic nitrogen bases boiling in the approximate range of 150–195° C. for removal of the discolorizing impurities. Among such heterocyclic bases are included alkyl pyrazines, such as dimethyl-, diethyl-, and methyl ethyl-pyrazine, and alkyl piperazines, such as methyl-, dimethyl, methyl ethyl-, and diethyl piperazine. These heterocyclic N bases are fairly soluble in aliphatic hydrocarbon liquid and therefore are readily removed from the crystals.

Since the fresh mother liquor from which triethylene diamine is initially crystallized already contains as by-products of the synthesis, various heterocyclic nitrogen bases of the type above described as well as some aliphatic amines, it has been found that such fresh mother liquor can be used effectively as such, after separation of the crystallized triethylene diamine therefrom, for treatment of an old batch of triethylene diamine crystals which have become discolored. Since such liquid contains a certain proportion of uncrystallized triethylene diamine therein, the loss of product as a result of such treatment is kept to a minimum.

The treatment of the discolored crystals with the aliphatic amine or heterocyclic nitrogen base or with the fresh mother liquor may be carried out simply by washing or triturating these crystals with the liquid preferably followed by washing with a liquid aliphatic hydrocarbon boiling up to about 130° C. A more complete removal of coloring impurities as well as of potential color formers, is obtained by solution of the off-color crystals and recrystallization from the fresh mother liquor. The off-color crystals are agitated in the fresh "mother liquor" with heating until dissolved, and the mixture cooled to room temperature; the recrystallized product being separated from the liquid by filtration, preferably followed by washing with paraffin hydrocarbon liquid.

The composition of fresh mother liquor will vary to some extent with changes in reaction conditions for producing the triethylene diamine, but in general the products from conversion of alkyl or alkylol amines at 300–500° C. over solid acidic catalyst, will contain in the fraction distilling in the range of from about 150 or 160° C. to about 195° C., in addition to the desired principal product, some 40 to 65% by volume of diazines including considerable quantities of alkyl piperazines and alkyl pyrazines, and smaller quantities of alkyl and alkylol amines. In a typical operation, commercial diethylene triamine and recycle cut were passed over activated kaolin cracking catalyst pellets (53% $SiO_2$, 45% $Al_2O_3$) at about 380° C. at substantially atmospheric pressure, and the reactor effluent condensed with removal of ammonia and light gas. The condensate was distilled to remove a cut boiling to 130° C. which was recycled to the initial reactor. To the residual liquid there was added a substantially equal volume of xylene and the mixture distilled with separation of a cut boiling over the range of 160 to 195° C., which was cooled to room temperature and the crystalline triethylene diamine recovered from the remaining mother liquor. The residual mother liquor in several separate runs analyzed: (by volume) about 20 to 25% of alkyl pyrazines and 20 to 30% of alkyl piperazines (chiefly N-aminoethyl piperazine) and about 4 to 5% of alkyl and alkylol amines, and 8 to 10% of aromatic hydrocarbons.

*Example*

A sample of diazabicyclo-octane crystals of originally about 95+% purity, which had been stored in a glass jar for several months, has become yellow. Approximately 90 parts of this discolored material was mixed with 189 parts (by weight) of fresh clear "mother liquor" from new batch preparations of triethylene diamine and the mixture agitated for about three hours and then drained of liquid. The drained crystals were washed once with used pentane (from previous wash recovery) and once with fresh pentane. About 80.5 parts of triethylene diamine crystals of normal white color were recovered which analyzed 97.7% pure. The restored white color was retained over several months of storage.

The "mother liquor" used for washing the discolored crystals in the above run was a collection from several batch operations after separation of crystalline triethylene diamine from a 160–195° C. cut, and having typical analyses as follows:

| | Vol. percent |
|---|---|
| Triethylene diamine (not crystallized) | 14–18 |
| Alkylated triethylene diamine | 2 |
| Alkyl piperazines } Piperazine | 28–38 |
| Alkyl pyrazines } Pyrazine | 20–27 |
| Ethylene diamine, N-methyl and N-ethyl homologues thereof, and ethanolamines | 4–5 |
| Aromatic hydrocarbons } Xylene and cumene | 8–9 |

In employing the fresh "mother liquor" or other liquid amines of the types described for washing of discolored triethylene diamine crystals, the quantity of liquid should be at least sufficient to form a slurry of the crystals and may be as high as up to 2 to 3 times by weight of the crystals. In operations involving solution and recrystallization of the discolored crystals, it is preferred that the liquid amine solvent be not substantially in excess of twice the weight of the crystals since larger quantities of liquid, while favoring higher product purity, are accompanied by greater loss in product recovery.

Obviously many modifications and variations of the invention as hereinbefore set forth may be made without departing from the spirit and scope thereof, and therefore only such limitations should be imposed as are indicated in the appended claims.

I claim:

1. The method of restoring white color to 1,4-diazabicyclo [2.2.2] octane solids which have become discolored on storage which comprises treating such discolored product with a solvent liquor comprising at least one organic nitrogen base selected from the group consisting of alkyl and alkylol amines, pyrazine, piperazine and lower alkyl homologues of pyrazine and piperazine, said liquid nitrogen base boiling in the range of about 115 to 195° C.; and separating the thus purified crystals from the liquor.

2. The method according to claim 1 wherein said organic nitrogen base is a diazine.

3. The method according to claim 2 wherein said diazine is an alkyl pyrazine.

4. The method according to claim 2 wherein said diazine is an alkyl piperazine.

5. The method according to claim 1 wherein said solvent liquor comprises fresh residual mother liquor obtained by removal of initial crystalline material from the distillate fraction of a reaction effluent obtained in the production of 1,4-diazabicyclo [2.2.7] octane, said distillate fraction boiling within the range of 150–195° C.

6. The method according to claim 5 wherein said mother liquor comprises approximately 40–65% by volume of diazines.

7. The method according to claim 1 wherein said treatment comprises heating of the solids in said solvent liquor until dissolution occurs, and cooling to effect recrystallization of the solids in purified condition.

No references cited.